Dec. 20, 1927.

K. BUBLA

PISTON SLIDE VALVE

Filed Oct. 11, 1926

1,653,202

Inventor:
Karl Bubla
by [signature]
Atty.

Patented Dec. 20, 1927.

1,653,202

UNITED STATES PATENT OFFICE.

KARL BUBLA, OF PILSEN, CZECHOSLOVAKIA.

PISTON SLIDE VALVE.

Application filed October 11, 1926, Serial No. 140,983, and in Czechoslovakia June 20, 1924.

My invention refers to valves and more especially to a piston slide valve which is adapted for use in connection with apparatus for the impregnation of lumber and wood in general. It is an object of my invention to provide a valve of the kind described which is capable of resisting the corrosive action of the substances used for impregnation and which insures a permanently reliable sealing of the conduits serving for the passage of the impregnating solution.

The impregnation of wood is frequently effected with the aid of solutions of mercuric chloride, copper sulfate or the like which exert a vigorous corrosive action on metals and therefore render it impossible to use metal valves in connection with the conduits through which these solutions pass. The valve according to the present invention is capable of withstanding all these corrosive actions by being made partly at least of concrete which is not attacked by the chemicals in question, the abrasion occurring between two concrete members when sliding upon each other being provided for by lining one of the cooperating members of the valve and preferably the valve box with a suitable material, such as glass, and covering the other member with leather or the like, glycerine or the like being used for lubricating the parts.

Figure 1:
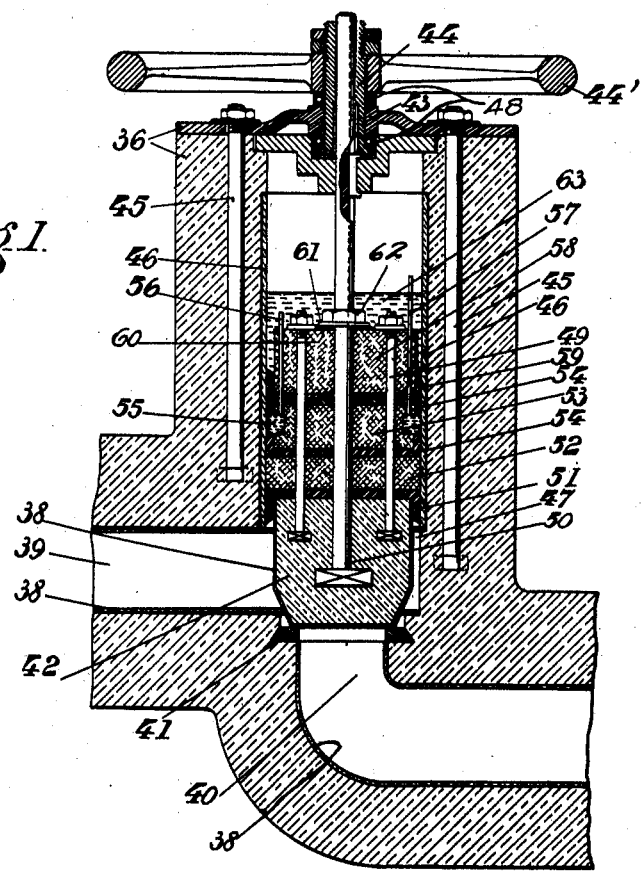

In the drawings affixed to this specification and forming part thereof two modifications of a valve embodying my invention are illustrated diagrammatically in axial section by way of example, Fig. 1 being a vertical section of my valve showing one form of structure and illustrating the method of utilizing the sealing and lubricating liquid.

Figure 2:
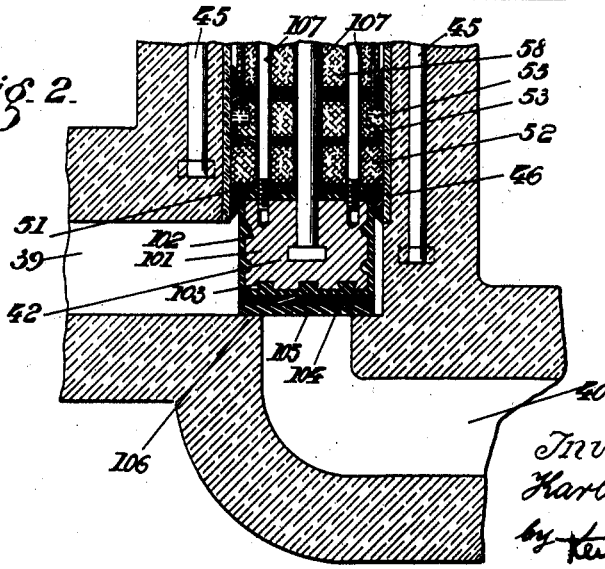

Fig. 2 being a vertical section of a modified form of the valve head and valve seat which may be employed in my valve structure.

Referring first to Fig. 1 of the drawings 36 is the valve box or casing and 42 is the valve piston. The passages 39 and 40 in the valve box are lined with an asphalt coating 38. On the valve seat is placed an annular rubber packing 41 presenting a bevelled outer edge. 43 is a cover plate mounted on top of the valve box 36 and fixed in place by screw bolts 45. Through this cover plate extends an internally threaded sleeve or nut 44 serving for raising and lowering the screw spindle carrying the piston.

The inner surface of the cylindrical part of the valve box, in which the valve proper is movably arranged, is lined with glass reinforced by wire netting. The valve piston moving within this glass cylinder 46 is formed of a cylindrical piece 42 of reinforced concrete, the bottom portion of which is conical in order to keep the surface of the valve seat as small as possible. This concrete body is mounted on the bottom part of the valve spindle 50 and of screw bolts 49 serving to mount thereon the other parts of the valve so as to ensure a tight seal. On top of the valve body proper 42 is placed a cup-shaped leather packing 51 covering the upper edge and upper part of the outer wall of the body 42. 52 is a fibre body moving in close contact with the glass cylinder 46; another fibre cylinder 53 is covered on both the upper and lower surfaces with leather packings 54 and has an annular groove 55 provided in its circumferential part, which is filled with glycerine or the like serving for lubricating the leather packings. Two conduits 56, 57, connect the groove 55 with the space above the piston, one of these conduits serving for supplying the groove with glycerine, while the other serves for allowing the escape of air. On top of the leather packing covering the body 53 is mounted a third fibre cylinder 58, the bottom portion of which is also covered with a leather packing 59, while on its upper surface rest the nuts of the screw bolts 49 and a leather ring 60, a washer 61 and a nut 62 serving for pressing the several parts together. A glycerine layer 63 covers the piston and serves as a further packing and for lubricating the leather insertions. In order to facilitate the operation of the valve, ball bearings 48 are provided between the cover plate 43 and the threaded sleeve 44 and hand wheel 44'.

In the modified valve disclosed in Fig. 2 the bottom part 101 consists of a metal block onto which is arranged a layer 100 of rubber fixed by vulcanization, inwardly directed flanges 102 extending into annular grooves of the metal block and dove-tailed ribs 103 formed on the rubber and extending into similar grooves of the metal block serving for preventing the rubber cover from being torn off. A bottom layer 104 of a harder rubber product is fixed by vulcanization and this layer is again protected by a bottom layer 105 of soft rubber resting on the concrete seat 106. The valve spindle and screw bolts 107 are preferably covered with vulcanized rubber layers.

I wish it to be understood that I do not desire to be limited to the exact details of construction shown and described, for obvious modifications will occur to a person skilled in the art.

I claim:—

1. Piston slide valve comprising a concrete valve box with a cylindrical guide surface and a piston slidably mounted therein, said piston comprising a block adapted to cooperate with a seat in said box, a fibre disc on said block, a spindle for handling said piston and a packing inserted between said block and said disc and said guide surface, respectively.

2. Piston slide valve comprising a concrete valve box with a cylindrical guide surface and a piston slidably mounted therein, said piston comprising a block adapted to cooperate with a seat in said box, a fibre disc on said block, a spindle for handling said piston, a packing inserted between said block and said disc and said guide surface respectively, and a sealing liquid on top of said disc.

3. Piston slide valve comprising a concrete valve box with a cylindrical guide surface and a piston slidably mounted therein, said piston comprising a block adapted to cooperate with a seat in said box, a grooved fibre disc on said block, a spindle for handling said piston, a packing inserted between said block and said disc and said guide surface respectively, and a sealing liquid on top and in the groove of said disc.

4. Piston slide valve comprising a concrete valve box with a cylindrical guide surface and a piston slidably mounted therein, said piston comprising a block adapted to cooperate with a seat in said box, a grooved fibre disc on said block, a spindle for handling said piston, a packing inserted between said block and said disc and said guide surface, respectively, communication between the top and the groove of said disc and a sealing liquid on top and in the groove of said disc.

In testimony whereof I affix my signature.

KARL BUBLA.